United States Patent
Meyer et al.

(10) Patent No.: US 10,671,671 B2
(45) Date of Patent: *Jun. 2, 2020

(54) SUPPORTING TUPLES IN LOG-BASED REPRESENTATIONS OF GRAPH DATABASES

(71) Applicant: LinkedIn Corporation, Sunnyvale, CA (US)

(72) Inventors: Scott M. Meyer, Berkeley, CA (US); Andrew J. Carter, Mountain View, CA (US); Andrew Rodriguez, Palo Alto, CA (US); Walaa Eldin M. Moustafa, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/618,238

(22) Filed: Jun. 9, 2017

(65) Prior Publication Data

US 2018/0357329 A1 Dec. 13, 2018

(51) Int. Cl.
*G06F 16/00* (2019.01)
*G06F 16/901* (2019.01)
(Continued)

(52) U.S. Cl.
CPC ........ *G06F 16/9024* (2019.01); *G06F 16/258* (2019.01); *G06F 16/90335* (2019.01)

(58) Field of Classification Search
None
See application file for complete search history.

(56) References Cited

U.S. PATENT DOCUMENTS

| 8,185,558 | B1 | 5/2012 | Narayanan |
| 8,533,182 | B1 | 9/2013 | Charboneau |

(Continued)

FOREIGN PATENT DOCUMENTS

| EP | 2937797 | | 10/2015 |
| WO | 2012091844 | A1 | 7/2012 |
| WO | 2017048303 | A1 | 3/2017 |

OTHER PUBLICATIONS

"Delta Encoding", Retrieved from: https://en.wikipedia.org/wiki/Delta_encoding, Retrieved Date: Apr. 10, 2017, 04 Pages.
(Continued)

*Primary Examiner* — Son T Hoang
(74) *Attorney, Agent, or Firm* — Park, Vaughan, Fleming & Dowler LLP; Chia-Hsin Suen (57) ABSTRACT

During operation, a system for processing queries of a graph database executes a set of processes for processing queries of a graph database storing a graph, wherein the graph comprises a set of nodes, a set of edges between pairs of nodes in the set of nodes, and a set of predicates. When a query of the graph database is received, the system obtains, from the query, a compound comprising a compound type and a set of identity-giving nodes. Next, the system uses the compound to access a tuple for storage in a log-based representation of the graph database, wherein the tuple includes the compound type and the identity-giving nodes. The system then uses the tuple to generate a result of the query and provides the result in a response to the query.

20 Claims, 8 Drawing Sheets

(51) Int. Cl.
G06F 16/25 (2019.01)
G06F 16/903 (2019.01)

(56) References Cited

U.S. PATENT DOCUMENTS

| | | | |
|---|---|---|---|
| 8,736,612 B1 | 5/2014 | Goldman | |
| 9,330,138 B1* | 5/2016 | Shankar | G06F 16/2452 |
| 9,378,241 B1 | 6/2016 | Shankar et al. | |
| 9,378,303 B1 | 6/2016 | Shankar | |
| 2003/0084043 A1 | 5/2003 | Acharya | |
| 2006/0004851 A1* | 1/2006 | Gold | G06F 16/252 |
| 2007/0192306 A1 | 8/2007 | Papakonstantinou | |
| 2007/0239694 A1 | 10/2007 | Singh | |
| 2008/0116449 A1 | 5/2008 | Macready | |
| 2008/0306910 A1 | 12/2008 | Singh | |
| 2009/0132503 A1 | 5/2009 | Sun | |
| 2009/0228434 A1 | 9/2009 | Krishnamurthy et al. | |
| 2009/0240649 A1 | 9/2009 | Sereni | |
| 2009/0240682 A1 | 9/2009 | Balmin | |
| 2010/0223606 A1 | 9/2010 | Park et al. | |
| 2011/0131199 A1 | 6/2011 | Simon et al. | |
| 2011/0270861 A1 | 11/2011 | Arshavsky | |
| 2011/0307524 A1 | 12/2011 | Aitken et al. | |
| 2012/0005224 A1 | 1/2012 | Ahrens | |
| 2012/0047114 A1 | 2/2012 | Duan | |
| 2012/0096043 A1 | 4/2012 | Stevens, Jr. | |
| 2012/0136884 A1 | 5/2012 | Kanawa | |
| 2012/0179644 A1 | 7/2012 | Miranker | |
| 2012/0284255 A1 | 11/2012 | Schechter | |
| 2013/0097180 A1 | 4/2013 | Tsent | |
| 2014/0095446 A1 | 4/2014 | Deshmukh et al. | |
| 2014/0172914 A1 | 6/2014 | Elinkety et al. | |
| 2014/0201234 A1 | 7/2014 | Lee et al. | |
| 2014/0280044 A1 | 9/2014 | Huynh et al. | |
| 2014/0310302 A1 | 10/2014 | Wu | |
| 2014/0330867 A1 | 11/2014 | Sarkar | |
| 2014/0337373 A1 | 11/2014 | Morsi | |
| 2015/0026158 A1 | 1/2015 | Jin | |
| 2015/0120717 A1 | 4/2015 | Kim | |
| 2015/0120775 A1 | 4/2015 | Shao | |
| 2015/0127677 A1 | 5/2015 | Wang | |
| 2015/0134637 A1 | 5/2015 | Pall | |
| 2015/0234894 A1 | 8/2015 | Dageville et al. | |
| 2015/0302300 A1 | 10/2015 | Fletcher | |
| 2016/0063121 A1* | 3/2016 | Agarwal | G06Q 10/00 707/706 |
| 2016/0171540 A1 | 6/2016 | Mangipudi | |
| 2016/0299991 A1* | 10/2016 | Hong | G06F 16/9024 |
| 2017/0054716 A1 | 2/2017 | Egorov et al. | |
| 2017/0083571 A1 | 3/2017 | Shankar et al. | |
| 2017/0090807 A1 | 3/2017 | Gupta et al. | |
| 2018/0039710 A1* | 2/2018 | Chen | G06F 16/24568 |
| 2018/0357328 A1 | 12/2018 | Meyer et al. | |
| 2018/0357330 A1 | 12/2018 | Rodriguez et al. | |
| 2019/0026334 A1 | 1/2019 | Ma et al. | |

OTHER PUBLICATIONS

Blandford, et al., "An Experimental Analysis of a Compact Graph Representation", In Proceedings of Sixth Workshop on Algorithm Engineering and Experiments, Jan. 1, 2004, 14 Pages.

Dean, Jeff, "Challenges in Building Large-Scale Information Retrieval Systems", In Proceedings of the Second ACM International Conference on Web Search and Data Mining, Feb. 9, 2009, 77 Pages.

Koszewnik, Drew, "The Netflix Tech Blog: NetflixGraph Metadata Library: An Optimization Case Study", Retrieved from: http://techblog.netflix.com/2013/01/netflixgraphmetadata-library_18.html, Jan. 18, 2013, 10 Pages.

Lemire, et al., "Decoding billions of integers per second through vectorization", In Journal of Software-Practice and Experience, vol. 45, Issue 1, Jan. 1, 2015, pp. 1-29.

Markis, et al., "A classification of NoSQL data stores based on key design characteristics", Retrieved from: https://www.sciencedirect.com/science/article/pii/S1877050916321007, Oct. 17, 2016, pp. 94-103.

"International Search Report and Written Opinion Issued in PCT Application No. PCT/US17/067866", dated Mar. 8, 2018, 10 Pages.

"International Search Report and Written Opinion Issued in PCT Application No. PCT/US17/67953", dated Feb. 26, 2018, 09 Pages.

Stepanov, et al., "SIMD-Based Decoding of Posting Lists", In Proceedings of the 20th ACM Conference on Information and Knowledge Management, Oct. 24, 2011, 10 Pages.

Lei Zou et al., "Summarization Graph Indexing: Beyond Frequent Structure-Based Approach", DASFAA 2008, LNCS 4947, pp. 141-155, XP-019087336, Mar. 2008.

David W Williams, "Graph Database Indexing Using Structured Graph Decomposition", 2007 IEEE, pp. 976-985, XP031095841, Apr. 2007.

Vijayan Prabhakaran, "Managing Large Graphs on Multi-Cores With Graph Awareness", USENIX, pp. 1-12, XP061013942, Apr. 11, 2013.

"Non Final Office Action Issued in U.S. Appl. No. 15/655,303", dated Aug. 23, 2019, 15 Pages.

"Non Final Office Action Issued in U.S. Appl. No. 15/618,371", dated Feb. 27, 2019, 12 Pages.

"Notice of Allowance Issued in U.S. Appl. No. 15/655,303", dated Jan. 30, 2020, 10 Pages.

He, et al., "Graphs-at-a-time: Query Language and Access Methods for Graph Databases", In Proceedings of the ACM SIGMOD International Conference on Management of Data, Jun. 9, 2008, pp. 405-417.

\* cited by examiner

SUPPORTING TUPLES IN LOG-BASED REPRESENTATIONS OF GRAPH DATABASES

RELATED APPLICATIONS

The subject matter of this application is also related to the subject matter in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016 (Attorney Docket No. LI-900942-US-NPL1).

The subject matter of this application is also related to the subject matter in a co-pending non-provisional application by the same inventors as the instant application and filed on the same day as the instant application, entitled "Functional Equivalence of Tuples and Edges in Graph Databases," having Ser. No. 15/618,235, and filing date Jun. 09, 2017 (Attorney Docket No. LI-902058-US-NP).

BACKGROUND

Field

The disclosed embodiments relate to graph databases. More specifically, the disclosed embodiments relate to techniques for supporting tuples in log-based representations of graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
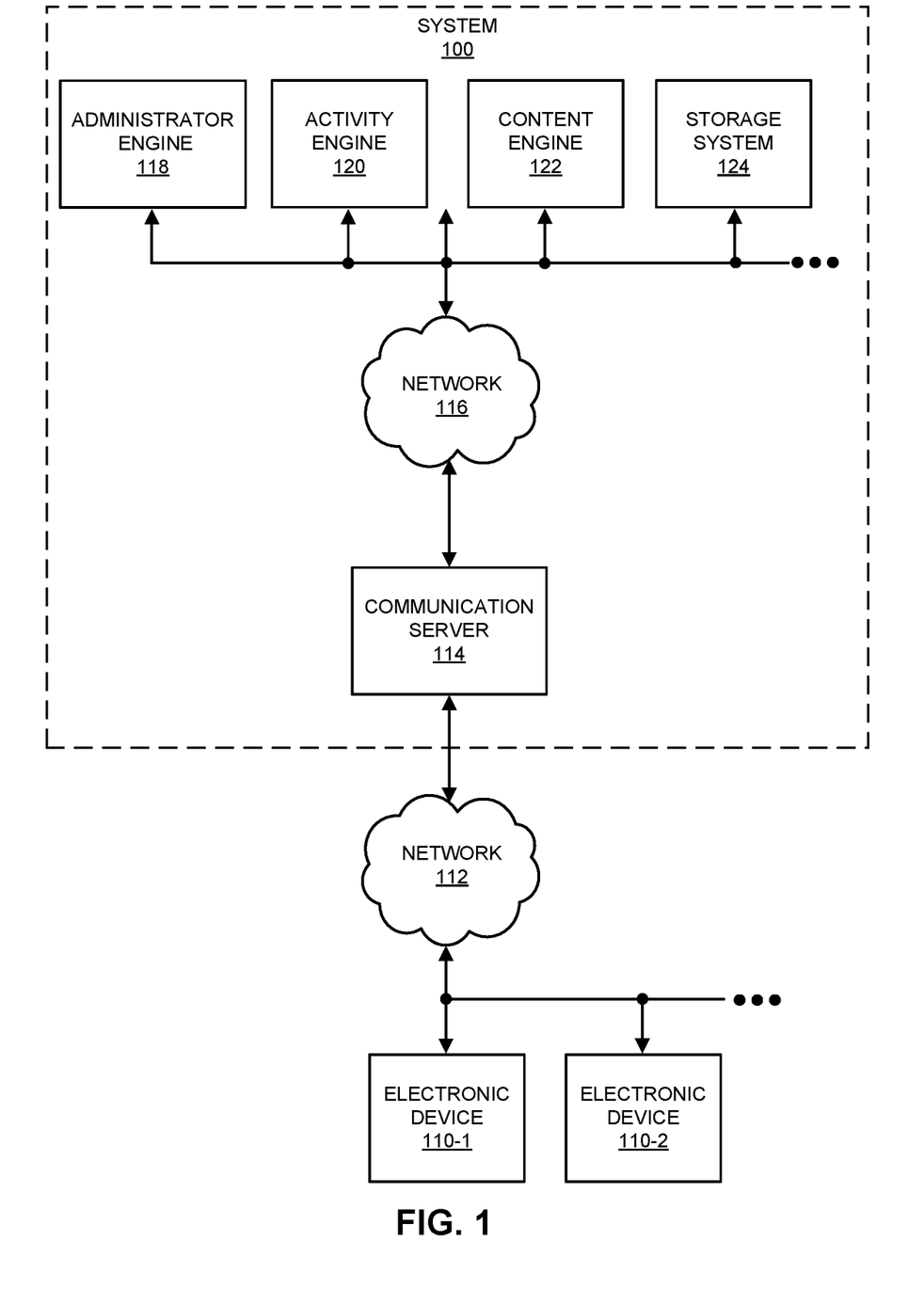
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
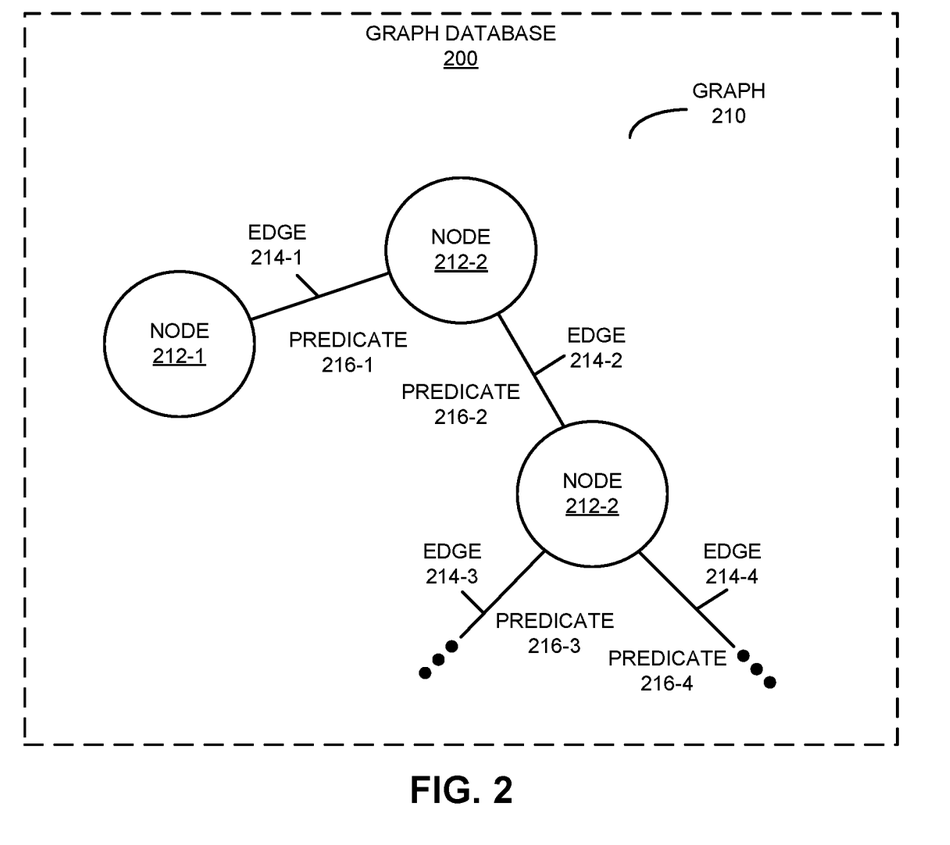
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, so that each node 212 in graph 210 includes a direct edge to its adjacent nodes without using an index lookup.

Note that graph database 200 may be an implementation of a relational model with constant-time navigation (i.e., independent of the size N), as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in U.S. Pat. No. 9,535,963 (issued 3 Jan. 2017), by inventors Srinath Shankar, Rob Stephenson, Andrew Carter, Maverick Lee and Scott Meyer, entitled "Graph-Based Queries," which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
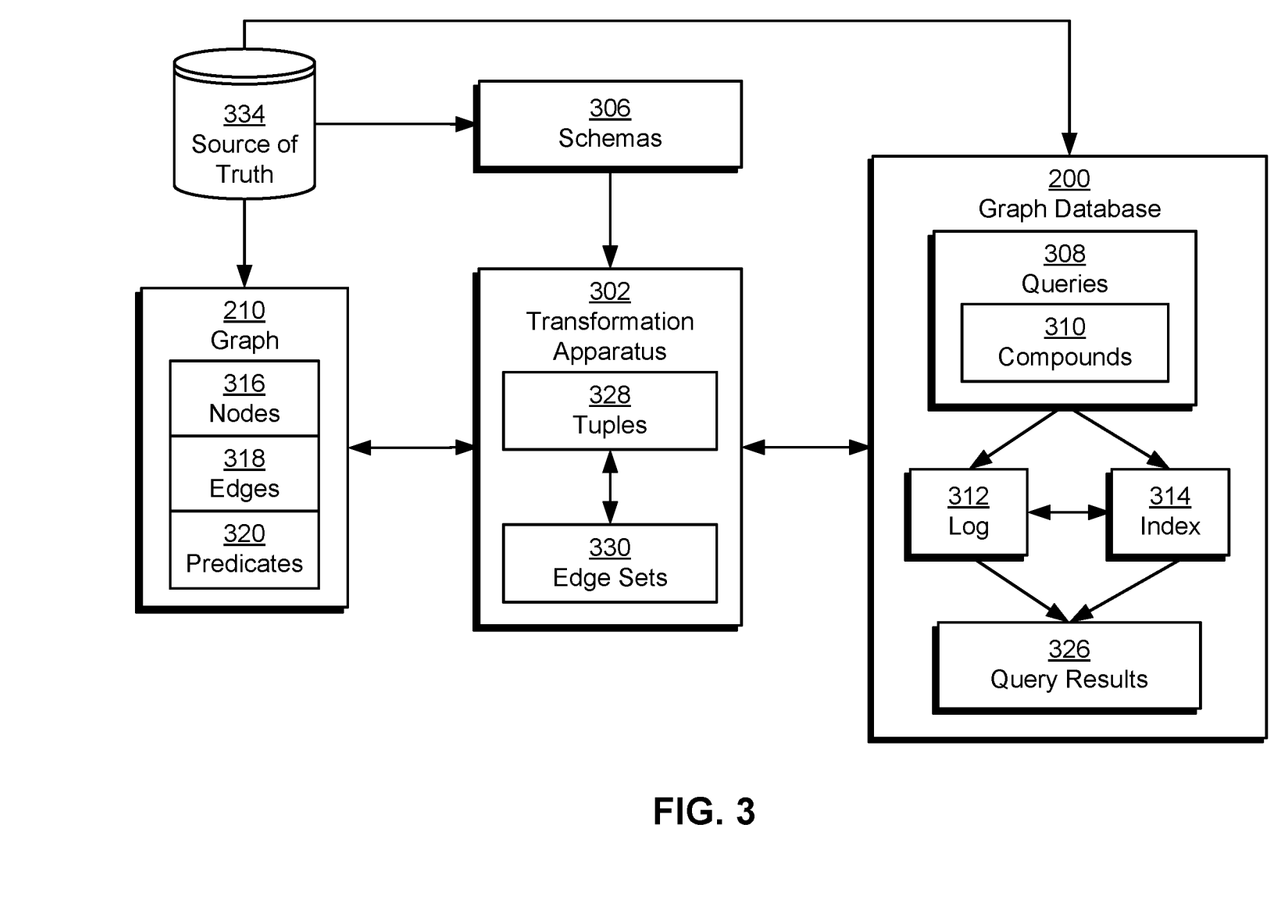
FIG. 3 shows a system for processing queries of a graph database in accordance with the disclosed embodiments.

In one or more embodiments, graph database 200 includes functionality to transform and evaluate missing values associated with nodes, edges, and/or other components of the graph database. As shown in FIG. 3, graph 210 and one or more schemas 306 associated with graph 210 may be obtained from a source of truth 334 for graph database 200. For example, graph 210 and schemas 306 may be retrieved from a relational database, distributed filesystem, and/or other storage mechanism providing the source of truth.

As mentioned above, graph 210 may include a set of nodes 316, a set of edges 318 between pairs of nodes, and a set of predicates 320 describing the nodes and/or edges. Each edge in the graph may be specified in a (subject, predicate, object) triple. For example, an edge denoting a connection between two members named "Alice" and "Bob" may be specified using the following statement:
    Edge("Alice", "ConnectedTo", "Bob").
In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:
    Edge("Alice", "ConnectedTo", "Bob")?
A subsequent statement may modify the initial statement with a tilde to indicate deletion of the edge from graph database 200:
    Edge~("Alice", "ConnectedTo", "Bob").

In addition, specific types of edges and/or complex relationships in graph 210 may be defined using schemas 306. Continuing with the previous example, a schema for employment of a member at a position within a company may be defined using the following:
    DefPred("employ/company", "1", "node", "0", "node").
    DefPred("employ/member", "1", "node", "0", "node").
    DefPred("employ/start", "1", "node", "0", "date").
    DefPred("employ/end_date", "1", "node", "0", "date").
    M2C@(e, memberId, companyId, start, end):—
        Edge(e, "employ/member", memberId),
        Edge(e, "employ/company", companyId),
        Edge(e, "employ/start", start),
        Edge(e, "employ/end_date", end)

In the above schema, a compound structure for the employment is denoted by the "@" symbol and has a compound type of "M2C." The compound is also represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

Consequently, compounds in queries 308 (e.g., compounds 310) or otherwise stored in graph database 200 may model complex relationships (e.g., employment of a member at a position within a company) using a set of basic types (i.e., edge sets 330 containing binary edges 318) in graph database 200. More specifically, each compound may represent an n-ary relationship in the graph, with each "component" of the relationship identified using the predicate and object (or subject) of an edge. A set of "n" edges that model the relationship may then be linked to the compound using a common subject (or object) that is set to a hub node representing the compound. In turn, new compounds may dynamically be added to graph database 200 without changing the basic types used in graph database 200 by specifying relationships that relate the compound structures to the basic types in schemas 306.

Graph 210 and schemas 306 may additionally be used to populate a graph database 200 for processing queries 308 against the graph. More specifically, a representation of nodes 316, edges 318, and predicates 320 may be obtained from source of truth 334 and stored in a log 312 in the graph database. Lock-free access to the graph database may be implemented by appending changes to graph 210 to the end of the log instead of requiring modification of existing records in the source of truth. In turn, the graph database may provide an in-memory cache of log 312 and an index 314 for efficient and/or flexible querying of the graph.

Nodes 316, edges 318, and predicates 320 may be stored as offsets in log 312. For example, the exemplary edge statement for creating a connection between two members named "Alice" and "Bob" may be stored in a binary log 312 using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to the graph is preserved in log 312, offsets in the log may be used as representations of virtual time in the graph. More specifically, each offset may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

Graph database 200 may also include an in-memory index 314 that enables efficient lookup of edges 318 by subject, predicate, object, and/or other keys or parameters 310. Index structures for graph databases are described in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016 (Attorney Docket No. LI-P1662.LNK.US), which is incorporated herein by reference.

In one or more embodiments, the system of FIG. 3 includes functionality to process queries 308 containing compounds 310 in graph 210. As mentioned above and in the above-referenced application, each compound may model an n-ary relationship as a series of edges that conform to a schema (e.g., schemas 306). The compound may also be included in one or more queries 308 that read and/or write records in graph database 200. For example, one or more records in graph database 200 may be created using the exemplary employment schema described above and the following query:

M2C@ (e, "5678", "9012", "1443657600", "2147483647").

The period at the end of the above query may be used to write, in graph database 200, records containing employment information for a member with a "memberID" of "5678" at a company with a "companyID" of "9012." The employment information additionally includes a start date with an epoch time of "1443657600" and an end date with an epoch time of "2147483647."

Conversely, records may be read from graph database 200 using the following query:

M2C@(e, "5678", "9012", "1443657600", "2147483647")?

The question mark at the end of the above query may be used to retrieve, from graph database 200, records matching the corresponding employment information represented by the following four edges:

Edge(e, "employ/member", "5678")
Edge(e, "employ/company", "9012")
Edge(e, "employ/start", "1443657600")
Edge(e, "employ/end_date", "2147483647")

The four edges share the hub node "e" as a common subject, include predicates specified in the "M2C" rule described above, and have objects matching the parameters of the query.

As discussed above, compounds 310 may be represented and/or stored as edge sets 330 (i.e., sets of edges) in graph database 200, with each edge set containing edges that share a hub node as a common subject (or, alternatively, a common object). Each edge in the edge set may also include a predicate specified in a schema (e.g., schemas 306) for the corresponding compound, as well as an object (or subject) containing a value for the attribute represented by the predicate.

Alternatively, compounds 310 may be formatted and/or stored as tuples 328 in graph database 200. Each tuple may include a header with information related to the tuple, including a length of the tuple, a write operation (e.g., addition or deletion) associated with the compound, and/or a set of cardinalities associated with predicates in the compound. The header may be followed by the compound type of the corresponding compound and a set of identity-giving nodes, with each identity-giving node containing a predicate-object pair that represents a corresponding attribute in the compound. Consequently, the tuple may be a compact representation of the compound that is efficiently referenced and stored within a single entry of log 312. Moreover, the tuple may be functionally equivalent to an edge set containing a hub node that identifies the tuple and predicate-object pairs from the tuple.

To facilitate processing of queries 308 containing compounds 310, a transformation apparatus 302 may use the functional equivalence between tuples 328 and the corresponding edge sets 330 to transform compounds 310 in queries 308 between tuples 328 and edge sets 330. For example, transformation apparatus 302 may use a compound from a query to retrieve a tuple from log 312 and/or index 314, transform the tuple into a corresponding edge set, and return the edge set in response to the query. In another example, transformation apparatus 302 may map a set of edges with the same hub node to a tuple and write the tuple to log 312 and/or index 314. Functional equivalence of tuples and edge sets in graph databases are described in further detail below with respect to FIG. 4.

After queries 308 are received and optionally transformed, transformation apparatus 302 and/or another query-processing component associated with graph database 200 may use queries 308 and graph database 200 to generate query results 326. For example, the component may map compounds 310 in queries 308 to tuples 328 and/or edge sets 330 in log 312 and/or index 314. The component may also transform between tuples 328 and/or edge sets 330 during processing of queries 308 so that query results 326 are stored in log 312 and/or returned in responses to queries 308 in a default and/or specified format.

Those skilled in the art will appreciate that the system of FIG. 3 may be implemented in a variety of ways. First, transformation apparatus 302, graph database 200, and/or source of truth 334 may be provided by a single physical machine, multiple computer systems, one or more virtual machines, a grid, one or more databases, one or more filesystems, and/or a cloud computing system. Transformation apparatus 302 and graph database 200 may additionally be implemented together and/or separately by one or more hardware and/or software components and/or layers.

Second, the functionality of the system may be used with other types of databases and/or data. For example, compounds 310, tuples 328, edge sets 330, and/or transformations of queries 308 may be performed with other systems that support flexible schemas and/or querying.

Figure 4:
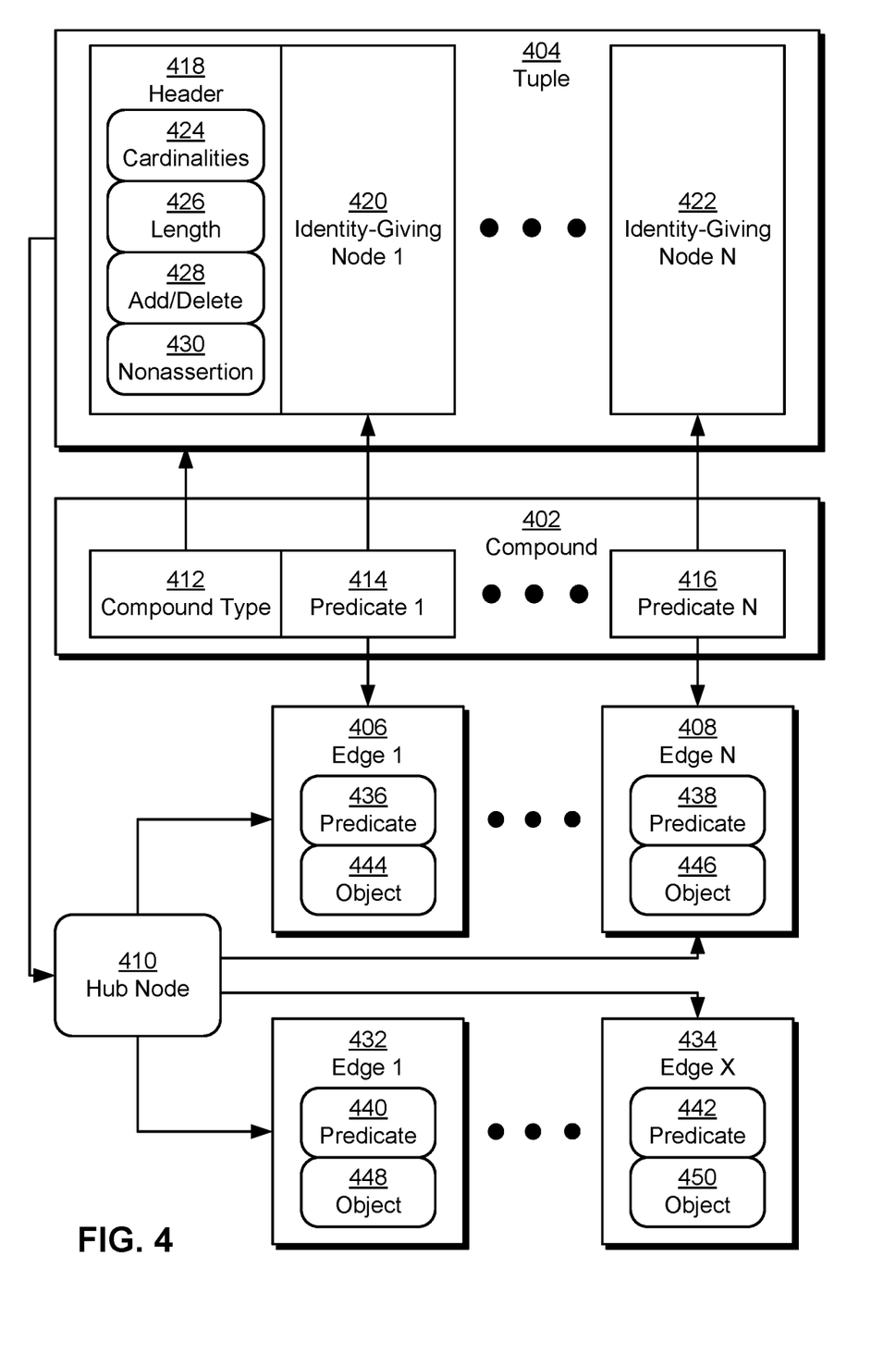
FIG. 4 shows a functional equivalence of a tuple and a set of edges in a graph database in accordance with the disclosed embodiments.

FIG. 4 shows a functional equivalence of a tuple 404 and a set of edges (e.g., edge 1 406, edge n 408) in a graph database in accordance with the disclosed embodiments. As mentioned above, tuple 404 and/or the set of edges may be created from a compound 402 that is defined using a schema for the graph database. In other words, compound 402 may act as a template for a given data type or structure in the graph database, and each tuple 404 and/or set of edges created from compound 402 may represent an instance of the data type or structure.

Moreover, compound 402 may define the functional equivalence between tuple 404 and the edge set. As shown in FIG. 4, compound 402 may include a compound type 412 and a set of predicates (e.g., predicate 1 414, predicate n 416). Compound type 412 may identify a data type representing compound 402, and the predicates may specify the types of data that give identity to compound 402. That is, predicates declared in compound 402 may be mandatory "identity-giving" attributes that are used to distinguish between different tuples, edge sets, and/or other instances of the n-ary relationship represented by compound 402.

A schema for compound 402 may specify compound type 412, the predicates, and a set of edges to which the predicates are mapped. For example, compound 402 may include the following schema for endorsement of a skill in an online professional network:

DefPred("endorser", "1", "node", "0", "node").
DefPred("endorsee", "1", "node", "0", "node").
DefPred("skill", "1", "node", "0", "node").
Endorsement@(h, Endorser, Endorsee, Skill):—
   Edge(h, "endorser", Endorser),
   Edge(h, "endorsee", Endorsee),
   Edge(h, "skill", Skill).

In the above schema, compound 402 is declared using the "@" symbol and specifies "Endorsement" as compound type 412. Compound 402 is represented by three predicates defined as "endorser," "endorsee," and "skill." The "endorser" predicate may represent a member making the endorsement, the "endorsee" predicate may represent a member receiving the endorsement, and the "skill" predicate may represent the skill for which the endorsement is given. The declaration is followed by a rule that maps the three predicates to three edges. The first edge uses the first predicate to identify the endorser as the value specified in an "Endorser" parameter, the second edge uses the second predicate identify the endorsee as the value specified in an "Endorsee" parameter, and the third edge uses the third predicate to specify the skill as the value specified in a "Skill" parameter. All three edges share a common subject denoted by "h," which functions as a hub node 410 that links the edges to form the compound relationship. Consequently, the schema may declare a trinary relationship for the "Endorsement" compound 402, with the relationship defined by identity-giving attributes with types of "endorser," "endorsee," and "skill" and values attached to the corresponding predicates.

As a result, predicates specified in the schema for compound 402 may be copied to predicates 436-438 of edges (e.g., edge 1 406, edge n 408) that model instances of compound 402. Objects 444-446 in the edges may store values related to identity-giving attributes represented by predicates 436-438, and hub node 410 may be included as a common subject shared by all of the edges.

For example, an instance of the "Endorsement" compound may be created using the following statement:
Endorsement@ (h, "Alice", "Bob", "C++").
The statement may be executed as a query that creates the following edge set in the graph database:
   Edge(h, "endorser", "Alice")
   Edge(h, "endorsee", "Bob")
   Edge (h, "skill", "C++")

Instances of the relationship represented by compound 402 may also, or instead, be modeled or stored using tuple 404. To identify each instance, compound type 412 may be specified in tuple 404. Tuple 404 may also include, as a set of identity-giving nodes (e.g., identity-giving node 1 420, identity-giving node n 422), a variable number of repeating key-value pairs, with each key set to a predicate in compound 402 and the value set to the corresponding object in an equivalent edge created from compound 402.

Continuing with the previous example, the "Endorsement" statement may be executed as a query that creates the following representation of identity-giving nodes in tuple 404:
   [("endorser", "Alice"), ("endorsee", "Bob"), ("skill", "C++")]
The above representation includes three key-value pairs that correspond to three identity-giving nodes in tuple 404. The first key-value pair stores the predicate and object from the first edge in the edge set ("endorser" and "Alice"), the second key-value pair stores the predicate and object from the second edge in the edge set ("endorsee" and "Bob"), and the third key-value pair stores the predicate and object from the third edge in the edge set ("skill" and "C++"). Consequently, predicates and objects in an edge representation of compound 402 (e.g., edge 1 406, edge n 408) may be mapped directly to key-value pairs in identity-giving nodes of tuple 404.

Tuple 404 may additionally be mapped to an equivalent edge representation using hub node 410. For example, an identifier for hub node 410 may be set to the offset of tuple 404 in a log-based representation of the graph database. The same identifier may then be included as a subject in edges that model the n-ary relationship in the instance of compound 402 stored in tuple 404. Moreover, predicates 436-438 and objects 444-446 in the edges may have the same values as the corresponding key-value pairs from the identity-giving nodes of tuple 404, as discussed above. In turn, each instance of compound 402 may be converted between an edge representation and tuple 404 using a mapping between hub node 410 and an identifier for tuple 404, as well as additional mappings between predicates 436-438 and objects 444-446 in the edges and identity-giving nodes in tuple 404.

An identifier for hub node 410 and/or tuple 404 may further be used to link additional, non-identity-giving attributes to the n-ary relationship represented by compound 402. The additional attributes may be modeled as edges (e.g., edge a 432, edge x 434) that contain hub node 410 as a subject but have pairs of predicates 440-442 and objects 448-450 that differ from those in compound 402. The additional attributes may also, or instead, be stored as key-value pairs following the identity-giving nodes in tuple 404.

Continuing with the previous example, the "Endorsement" statement may be supplemented using the following:

Endorsement@(h, "Alice", "Bob", "C++"), Edge(h, "score", "3.0").

In the above modified statement, an instance of the "Endorsement" compound 402 may be supplemented with an additional edge containing a predicate of "score" and an object of "3.0." The additional edge may store, as an additional "optional" attribute of the trinary relationship, a numeric score of 3.0 that represents the strength of the corresponding endorsement. Because the "score" predicate is non-identity-giving with respect to the "Endorsement" compound 402, the score may be created or updated independently of the endorsement instance (e.g., as the score is computed or updated offline). The "score" predicate may further have a cardinality of one, such that a subsequent edge with a subject set to the hub node of the endorsement instance and the "score" predicate replaces a previous edge with the same subject and predicate.

The modified statement may alternatively be specified using the following:

Edge(Endorsement@(h, "Alice", "Bob", "C++"), "score", "3.0").

In the above statement, a declaration of the "Endorsement" compound instance is nested within a statement for the edge that specifies the additional attribute associated with the instance.

To further define tuple 404 as an instance of compound 402, identity-giving nodes in tuple 404 may conform to a pre-specified ordering. For example, predicates in the identity-giving nodes may be sorted alphabetically, by cardinality, and/or according to other criteria. In turn, the ordering may reconcile the inherent ordering of elements in tuples with an unordered collection of edges as two different representations of compound relationships in the graph database.

Tuple 404 also includes a header 418 with additional information for use in processing queries related to tuple 404 and/or compound 402. First, header 418 specifies a set of cardinalities 424 associated with the identity-giving nodes. Cardinalities 424 may optionally be specified for non-identity giving, optional attributes (e.g., scores) if the attributes are also stored in tuple 404. For example, cardinalities 424 may include bits, tags, and/or other indicators that distinguish between predicates with cardinalities that are equal to one and predicates with cardinalities that are greater than one. As a result, a predicate with a cardinality that is equal to one (e.g., a birthdate) can only be found once in the entire tuple 404, while a predicate with a cardinality that is greater than one (e.g., a friend or connection) can appear multiple times in tuple 404.

Second, header 418 includes a length 426 of tuple 404. For example, length 426 may specify the number of bytes occupied by tuple 404 after header 418. In another example, length 426 may include the number of identity-giving nodes, and optionally, the number of non-identity giving attributes following the identity-giving nodes in tuple 404. In turn, length 426 and/or cardinalities 424 may allow tuple 404 to be adapted to compound relationships of arbitrary arity and/or predicates with different cardinalities.

Third, header 418 includes a number of indications related to write operations in the graph database. As shown in FIG. 4, the indications include an add/delete 428 indication and a nonassertion 426 indication. Add/delete 428 may be a bit, flag, and/or other data type that identifies tuple 404 as an addition of the corresponding instance of compound 402 to the graph database or a deletion of the instance from the graph database.

Nonassertion 426 may be used to indicate or "declare" an instance of compound 402 without asserting the instance as added or deleted in the graph database. As a result, nonassertion 426 may be used to refer to the instance in the graph database without changing the existence of the instance in the graph. For example, nonassertion 426 may be used in the following query:

Endorsement@&(h, "Alice", "Bob", "C++"), Edge(h, "score", "3.0").

In the above query, the "Endorsement" compound 402 is declared with an ampersand symbol "&," indicating that nonassertion 426 is to be applied to the "Endorsement." The declaration may be used to identify the compound 402 instance to which the subsequent "score" edge refers without modifying the current state of the instance in the graph. Thus, if the instance already exists in the graph database (i.e., if a tuple or set of edges representing the instance can be found in the graph database), the edge is written to the graph database without modifying the instance's existing state in the graph (e.g., added, deleted, or nonasserted). Conversely, if the instance does not exist in the graph database (i.e., if a tuple or set of edges representing the instance cannot be found in the graph database), the instance is written to the graph database as tuple 404 and/or an edge set, and an indication of nonassertion 430 (e.g., a bit or flag) is included with the instance. The indication of nonassertion 430 may allow the "score" edge to refer to the instance without asserting that the edges and/or identity-giving nodes in the instance have been added to or deleted from the graph.

Subsequent queries of a given instance of compound 402 may be processed based on the state of the instance in the graph database. In particular, the first addition or nonassertion 430 of the instance may cause the instance to be written to the graph database with the corresponding state (i.e., added or nonasserted). A subsequent write of the instance to the graph database may then be asserted or deduplicated based on the existing state of the instance and the state to be applied to the instance with the write, as described in further detail below with respect to FIG. 5.

Figure 5:
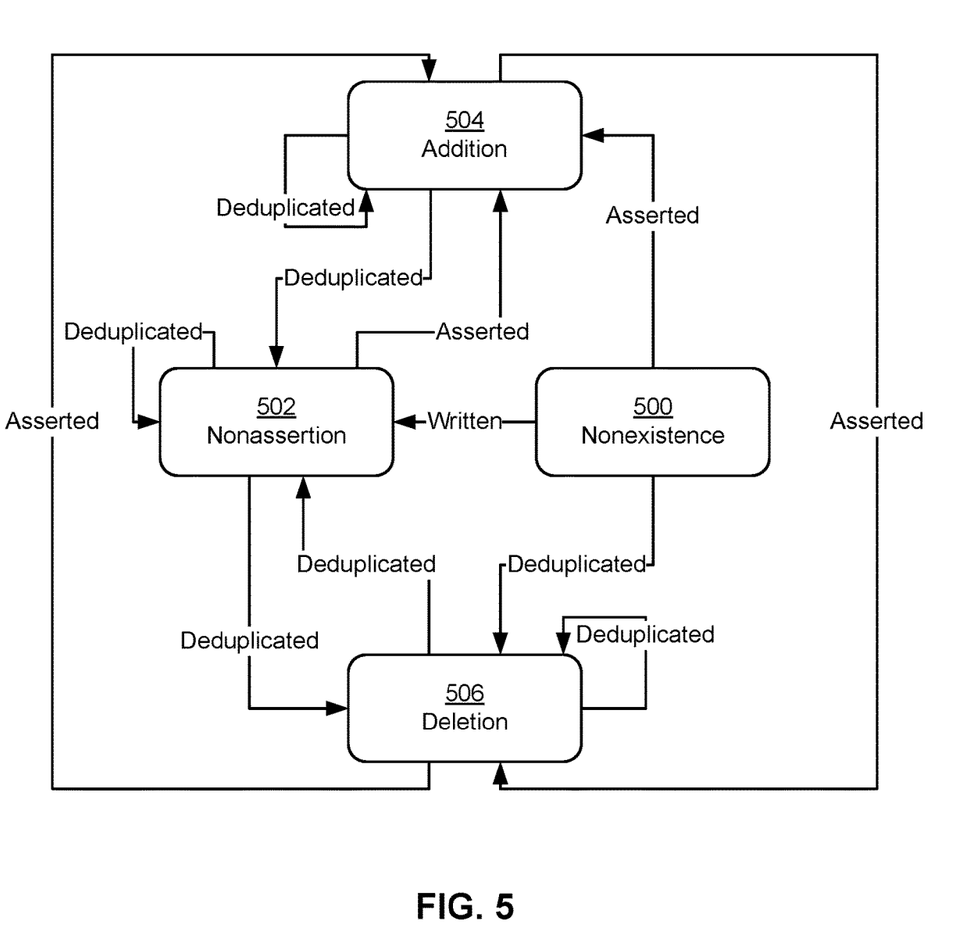
FIG. 5 shows the processing of write operations associated with a tuple in a graph database in accordance with the disclosed embodiments.

FIG. 5 shows the processing of write operations associated with a tuple in a graph database in accordance with the disclosed embodiments. As discussed above, the tuple may store or model an instance of a compound in the graph database, such as compound 402 of FIG. 4. The instance may alternatively or additionally be represented as a collection of edges in the graph database. Thus, processing of write operations described below may be applied to the collection of edges, in lieu of or in addition to applying the same processing to the functionally equivalent tuple.

Queries that write or modify the state of the tuple (or functionally equivalent collection of edges) in the graph database may be asserted, deduplicated, and/or written based on the previous state of the instance in the graph. As shown in FIG. 5, the state of the tuple may include an addition 504 of the tuple, a deletion 506 of the tuple, and/or a nonassertion 502 of the tuple.

Before the instance is declared in a query, the tuple may have a state of nonexistence 500 in both the graph and graph database. That is, both the graph and graph database may lack data that identifies the tuple. As a result, a query that specifies addition 504 of the tuple may be asserted (i.e., applied). For example, the instance's state may be changed from nonexistence 500 to addition 504 by writing an entry containing the tuple to the graph database and including an indication of addition 504 in the entry.

A query that changes the instance's state from nonexistence 500 to nonassertion 502 may result in writing of the tuple to the graph database and setting an indication of nonassertion 502 in the tuple. Because the instance is in a state of nonassertion 502, the tuple may be used to identify the instance without adding the instance to the graph stored in the graph database. As a result, the nonasserted instance may be omitted from results of subsequent read queries, even when identity-giving attributes of the tuple match parameters of the read queries. On the other hand, the tuple is the first occurrence of the instance in a log-based representation of the graph database and thus acts as a "declaration" of the instance in the graph database. As a result, the offset of the nonasserted tuple may be used as an identifier for the instance (e.g., in subsequent writes that change the state of the instance). The offset may also define a hub node for a set of edges representing the instance.

Finally, a query that changes the instance's state from nonexistence 500 to deletion 506 may be deduplicated. For example, a query that specifies deletion 506 of a nonexistent instance from the graph database may be discarded.

Addition 504 of the instance after an initial nonassertion 502 of the instance may result in the assertion of addition 504. For example, an entry containing the tuple or a reference to the initially nonasserted tuple may be appended to a log-based representation of the graph database, and an indication of addition 504 may be included in the entry. Because the appended entry occurs after the earlier nonassertion 502 of the instance, addition 504 of the instance in the appended entry may be applied as a change to the graph database that overrides the previous nonassertion 502 of the instance.

After addition 504 of the tuple is asserted, subsequent additions and nonassertions of the instance may be deduplicated (e.g., by not making the corresponding writes to the graph database). Similarly, after an initial nonassertion 502 of the instance is written to the database, subsequent nonassertions and deletions of the instance may be deduplicated.

A query that specifies deletion 506 after addition 504 may be asserted. For example, an entry containing the tuple or a reference to an identifier for the tuple may be appended to the log-based representation of the graph database, and an indication of deletion 506 may be included in the entry. In turn, the appended entry may cause the earlier addition 504 of the instance to be modified by deletion 506.

Similarly, a query that specifies addition 504 after the tuple was previously deleted may be asserted. For example, an entry containing the tuple or a reference to an identifier for the tuple may be appended to the log-based representation of the graph database, and an indication of addition 504 may be included in the tuple. The appended entry may thus undo the previous deletion 506 by re-adding the instance to the graph.

Figure 6:
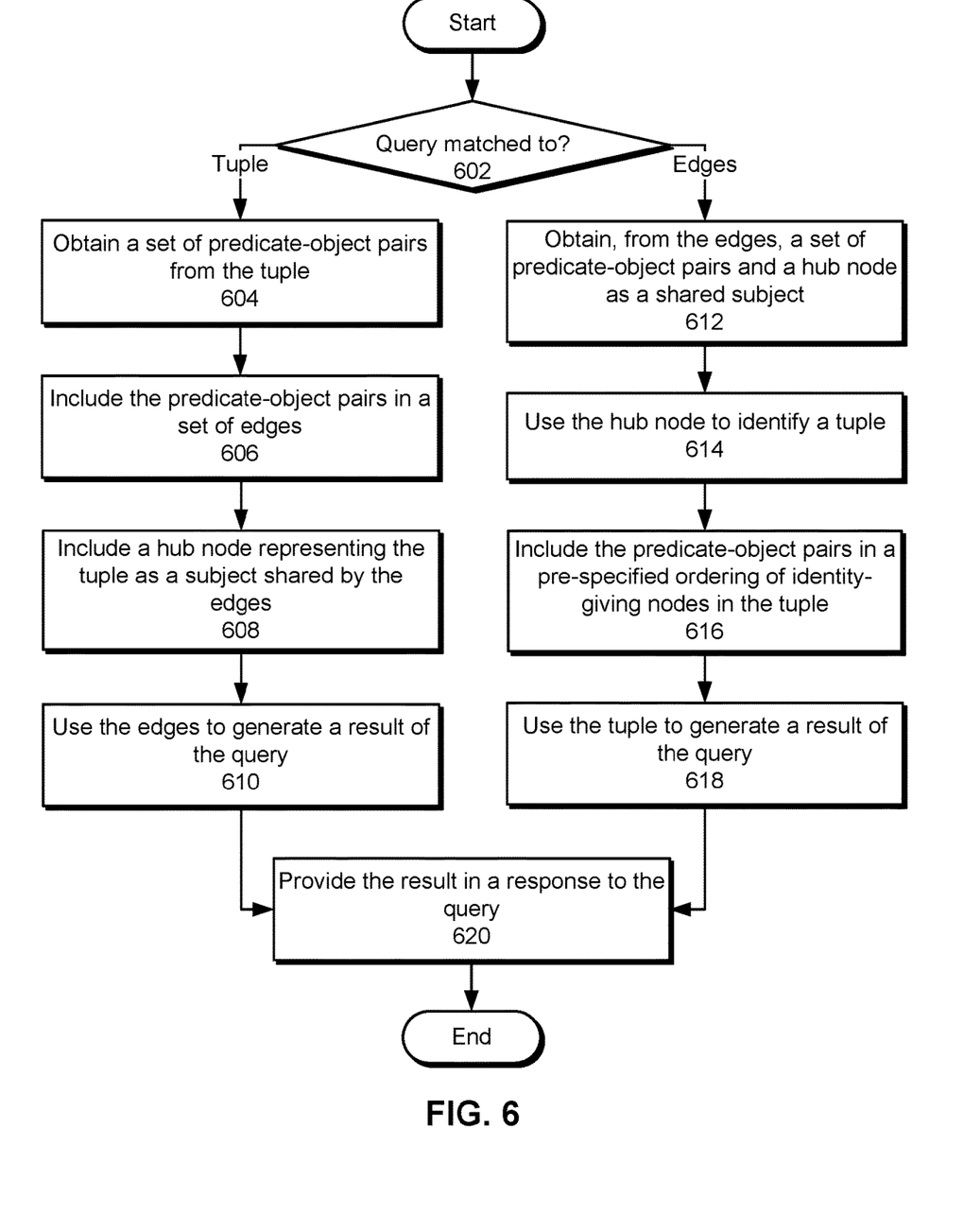
FIG. 6 shows a flowchart illustrating the processing of a query of a graph database in accordance with the disclosed embodiments.

FIG. 6 shows a flowchart illustrating the processing of a query of a graph database in accordance with the disclosed embodiments. More specifically, the flowchart of FIG. 6 illustrates the transformation between a tuple and a set of edges in the graph database during processing of the query. In one or more embodiments, one or more of the steps may be omitted, repeated, and/or performed in a different order. Accordingly, the specific arrangement of steps shown in FIG. 6 should not be construed as limiting the scope of the technique.

Initially, the query is matched to a tuple or a set of edges (operation 602). For example, the query may specify a compound relationship in the graph database as the tuple or set of edges. The compound may be nested within another statement in the query. Alternatively, the query may specify one or more identity-giving attributes associated with an instance of a compound in the graph database. The identity-giving attributes may then be matched to the tuple or set of edges based on a parameter of the query, a configuration parameter for the graph database, and/or a default representation for the compound.

If the query is matched to a tuple, the tuple is transformed into the corresponding set of edges. First, a set of predicate-object pairs is obtained from the tuple (operation 604) and included in the set of edges (operation 606). For example, the predicate-object pairs may be obtained from a list of identity-giving nodes in the tuple, and each predicate-object pair from the tuple may be used to populate a separate edge.

Next, a hub node representing the tuple is included as a subject shared by the edges (operation 608). For example, an offset of the tuple in a log-based representation of the graph database may be used as an identifier for the hub node, and the subject of each edge may be set to the identifier. The edges are then used to generate a result of the query (operation 610). For example, the edges may be included in the result, written to the graph database, used to generate a "symbolic graph" as a subset of the graph stored in the graph database, and/or otherwise used in processing of the query. A write operation associated with the tuple may also be propagated to the edges. For example, addition, deletion, or non-assertion of the tuple may be specified in one or more bits, flags, and/or other indications in the edges.

If the query is matched to a set of edges, the edges are transformed into the tuple. First, a set of predicate-object pairs is obtained from the edges, along with a hub node that is shared as a subject by the edges (operation 612). The predicate-object pairs may specify identity-giving attributes that contribute to the identity of the compound instance, and the hub node may identify the compound instance.

Next, the hub node is used to identify the tuple (operation 614), and the predicate-object pairs are included in a pre-specified ordering of identity-giving nodes in the tuple (operation 616). For example, an offset that specifies the tuple's location in a log-based representation of the graph database may be obtained from an identifier for the hub node. The offset may be set as the identifier for the tuple, and the tuple may be populated the predicate-object pairs as repeating key-value pairs representing the identity-giving nodes. The pre-specified ordering may be applied to the predicates of the predicate-object pairs to ensure that the tuple is generated in a predictable way from an unordered collection of edges. The tuple is then used to generate a result of the query (operation 618). For example, the tuple may be included in the result, written to the graph database, and/or otherwise used in processing of the query. A write operation associated with the edges may also be propagated to the tuple.

A rule for the compound may be used to transform between the tuple and the edges. For example, the rule may map identity-giving nodes in the tuple to values in the edges, thereby allowing a tuple representation of the compound to be transformed into a functionally equivalent set of edges and the set of edges to be transformed into the tuple.

Finally, the result is provided in a response to the query (operation 620). For example, the result may include the tuple and/or set of edges generated in the previous operations. Alternatively, the result may include an indication that the tuple and/or set of edges was successfully written to the graph database, along with one or more identifiers for graph database entries containing the tuple and/or set of edges.

Figure 7:
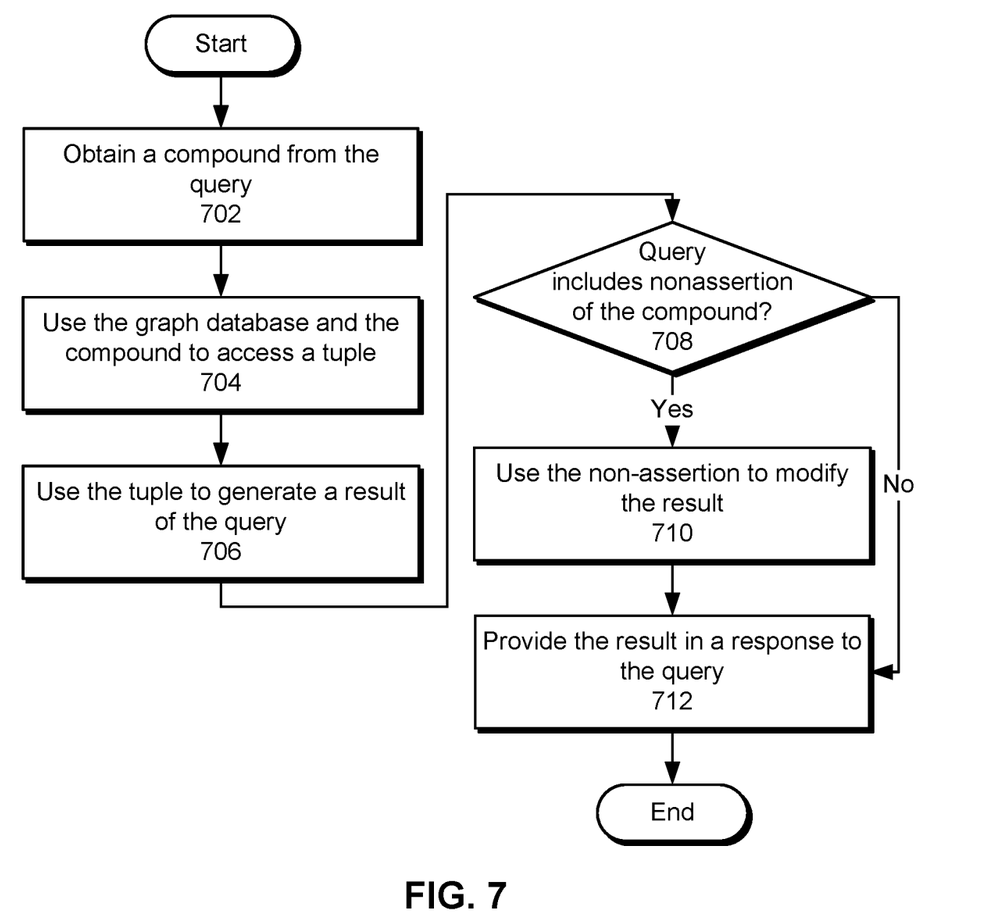
FIG. 7 shows a flowchart illustrating the processing of a query of a graph database in accordance with the disclosed embodiments.

FIG. 7 shows a flowchart illustrating the processing of a query of a graph database in accordance with the disclosed embodiments. In particular, the flowchart of FIG. 7 illustrates the use of a tuple in a log-based representation of the graph database to process the query. In one or more embodiments, one or more of the steps may be omitted, repeated, and/or performed in a different order. Accordingly, the specific arrangement of steps shown in FIG. 7 should not be construed as limiting the scope of the technique.

First, a compound is obtained from the query (operation 702). The compound may model an n-ary relationship in the graph database, such as a set of related attributes that define the relationship. For example, the compound may describe employment of a member at a company and include identity-giving attributes such as the member, the company, a start date of the member's employment at the company, and an end date of the member's employment at the company. In another example, the compound may model an endorsement and include identity-giving attributes of an endorser, an endorsee, and a skill to which the endorsement applies.

Next, the compound and the graph database are used to access a tuple (operation 704). For example, the compound may include values of one or more identity-giving attributes that are matched to an existing tuple in the log-based representation and/or used to write the tuple to the log-based representation.

The tuple is then used to generate a result of the query (operation 706). For example, the tuple may be written to the log-based representation according to a pre-specified ordering of the identity-giving nodes in the compound. In another example, the tuple may be read from the log-based representation after matching parameters of the query to one or more identity-giving nodes and/or optional attributes in the tuple. In a third example, the tuple may be transformed into a set of edges, and the edges may be included in the result.

The query may also include a nonassertion of the compound (operation 708). The nonassertion may be used to "declare" the compound without affecting the compound's existing state in the graph stored in the graph database. For example, the nonassertion may be used to add a non-identity-giving attribute that references the tuple to the graph database, even if the tuple has not yet been added to the graph or graph database or has been deleted from the graph (e.g., using a delete operation in the graph database).

If the query does not include a nonassertion of the compound, the result is provided in a response to the query (operation 712) without modifying the result. For example, the result may include the values stored in the tuple when the tuple matches one or more parameters of a read query. In another example, the result may include a processing status (e.g., successful, unsuccessful, etc.) associated with processing a write query that writes (e.g., adds or deletes) the tuple or attributes associated with the tuple to the graph database.

If the query includes the nonassertion, the nonassertion is used to modify the result (operation 710) before providing the result in the response (operation 712). When the tuple does not exist in the graph database, the tuple and an attribute that refers to the compound are added to the graph database, and an indication of the non-assertion is included in the tuple. An offset of the tuple is also included in the result as an identifier for the compound. The non-assertion indication may prevent the tuple from being inadvertently "asserted" (e.g., interpreted as added or deleted) in subsequent queries of the graph database. When the tuple exists in the graph database, the non-assertion is deduplicated. In turn, an attribute that refers to the compound may be added to the graph database without modifying a state of the tuple (e.g., addition, deletion, or nonassertion) in the graph or graph database.

Figure 8:
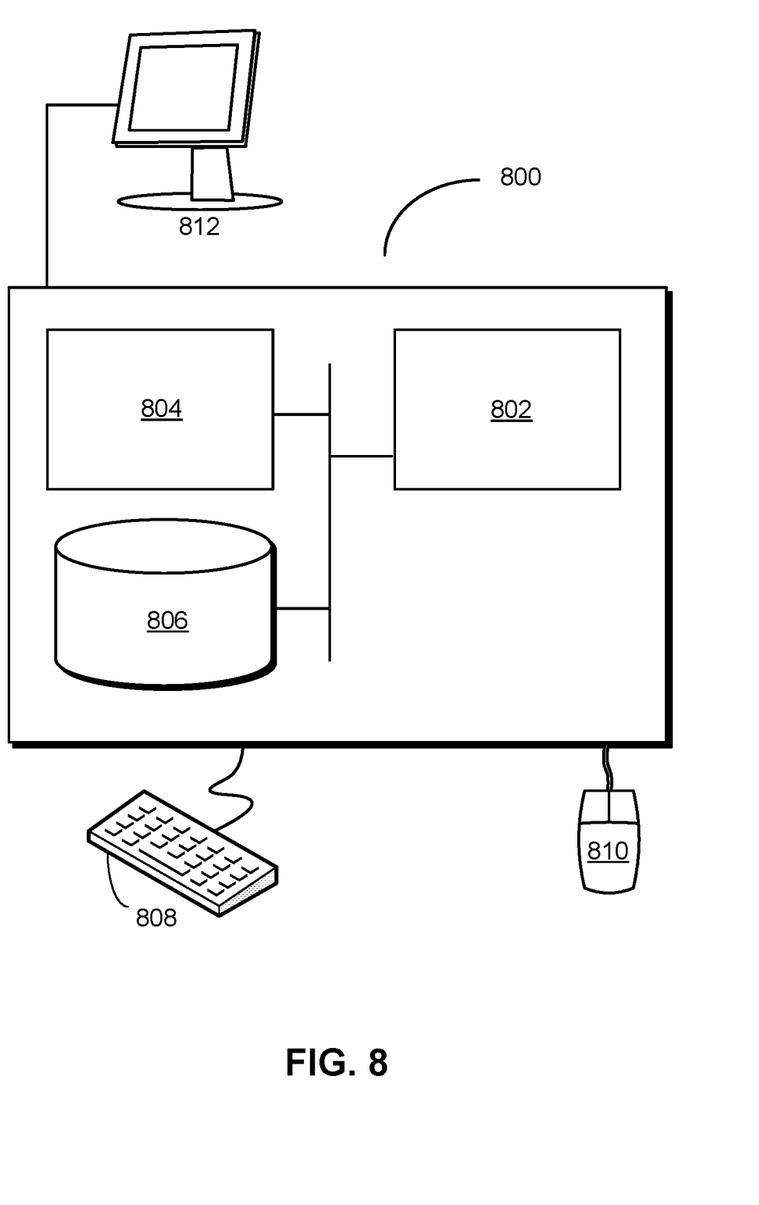
FIG. 8 shows a computer system in accordance with the disclosed embodiments.

FIG. 8 shows a computer system in accordance with the disclosed embodiments. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for processing queries of a graph database. The system includes a set of processes, which may include a single write process and multiple read processes. When a query of the graph database is received, one or more of the processes may process the query by obtaining, from the query, a compound containing a compound type and a set of identity-giving nodes. Next, the process(es) may use the compound to access a tuple for storage in a log-based representation of the graph database. The process(es) may then use the tuple to generate a result of the query and provide the result in a response to the query.

The process(es) may also, or instead, obtain a first query containing a first tuple and a second query containing a first set of edges. Next, the process(es) may transform the first tuple into a second set of the edges and the first set of the edges into a second tuple. The process(es) may then use the second subset of the edges to generate a first result of the first query and the second tuple to generate a second result of the second query. Finally, the process(es) may provide the first result in a first response to the first query and the second result in a second response to the second query.

In addition, one or more components of computer system 1000 may be remotely located and connected to the other components over a network. Portions of the present embodiments (e.g., log, index, transformation apparatus, graph database, etc.) may also be located on different nodes of a distributed system that implements the embodiments. For example, the present embodiments may be implemented using a cloud computing system that processes queries of a distributed graph database from a set of remote users and/or clients.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method, comprising:
   executing a set of processes for processing queries of a graph database storing a graph, wherein the graph comprises a set of nodes, a set of edges representing relationships between pairs of nodes in the set of nodes, and a set of predicates wherein each predicate labels a respective relationship represented by a respective edge; and when a query of the graph database is received, using one or more of the processes to process the query by:
obtaining, from the query, a compound representing a compound relationship specified by two or more edges in the set of edges, wherein
the compound is structured as a tuple which comprises a compound type representing a data type of the compound, and a set of identity-giving nodes,
each identity-giving node in the set of identity-giving node includes a predicate in the set of predicates and a corresponding node in the set of nodes, and
the tuple does not include any edge in the two or more edges;
using the compound type and the set of identity-giving nodes to search the tuple in the graph database;
if the tuple is located in the graph database, using the tuple to generate a result of the query; and
providing the result in a response to the query.

2. The method of claim 1, further comprising:
obtaining a non-assertion of the compound from the query; and
using the non-assertion to modify the result of the query.

3. The method of claim 2, wherein the using the non-assertion to modify the result comprises:
when the tuple does not exist in the graph database:
adding the tuple and an attribute that refers to the compound to the graph database; and
including an indication of the non-assertion in the tuple.

4. The method of claim 3, wherein the using the non-assertion to modify the result further comprises:
including, in the result, an offset of the tuple as an identifier for the compound.

5. The method of claim 2, wherein the using the non-assertion to modify the result comprises:
when the tuple exists in the graph database, adding an attribute that refers to the compound to the graph database without modifying a state of the tuple in the graph database.

6. The method of claim 5, wherein the state of the compound is at least one of:
the non-assertion;
an addition; and
a deletion.

7. The method of claim 1, wherein the using the tuple to generate the result of the query comprises:
writing the tuple to a log-based representation of the graph database according to a pre-specified ordering of the set of identity-giving nodes in the compound.

8. The method of claim 1, wherein the using the tuple to generate the result of the query further comprises:
transforming the set of identity-giving nodes in the tuple into a set of edges; and
including the set of edges resulted from the transforming in the result.

9. The method of claim 1, wherein each node in the set of identity-giving nodes comprises a predicate-object pair.

10. The method of claim 9, wherein the tuple further comprises a cardinality associated with a predicate in the predicate-object pair.

11. The method of claim 1, wherein the tuple further comprises a length.

12. An apparatus, comprising:
one or more processors; and
memory storing instructions that, when executed by the one or more processors, cause the apparatus to:
execute one or more processes for providing a graph database storing a graph, wherein the graph comprises a set of nodes, a set of edges representing relationships between pairs of nodes in the set of nodes, and a set of predicates wherein each predicate labels a respective relationship represented by a respective edge;
obtain, from a query of the graph database, a compound the set of edges, wherein
the compound is structured as a tuple which comprises a compound type representing a data type of the compound, and a set of identity-giving nodes,
each identity-giving node in the set of identify-giving nodes includes a predicate in the set of predicates and a corresponding node in the set of nodes, and
the tuple does not include any edge in the two or more edges;
use the compound type and the set of identity-giving nodes to search the tuple in the graph database;
if the tuple is located in the graph database, use the tuple to generate a result of the query; and
provide the result in a response to the query.

13. The apparatus of claim 12, wherein the memory further stores instructions that, when executed by the one or more processors, cause the apparatus to:
obtain a non-assertion of the compound from the query; and
use the non-assertion to modify the result of the query.

14. The apparatus of claim 13, wherein the using the non-assertion to modify the result comprises:
when the tuple does not exist in the graph database:
adding the tuple and an attribute that refers to the compound to the graph database; and
including an indication of the non-assertion in the tuple.

15. The apparatus of claim 14, wherein the using the non-assertion to modify the result further comprises:
including, in the result, an offset of the tuple as an identifier for the compound.

16. The apparatus of claim 13, wherein the using the non-assertion to modify the result comprises:
when the tuple exists in the graph database, adding an attribute that refers to the compound to the graph database without modifying a state of the tuple in the graph database.

17. The apparatus of claim 16, wherein the state of the compound is at least one of:
the non-assertion;
an addition; and
a deletion.

18. The apparatus of claim 12, wherein the tuple further comprises:
a length; and
a cardinality associated with a predicate in the set of identity-giving nodes.

19. A system, comprising:
a graph database storing a graph, wherein the graph comprises a set of nodes, a set of edges representing relationships between pairs of nodes in the set of nodes, and a set of predicates wherein each predicate labels a respective relationship represented by a respective edge; and a processing module comprising a non-transitory computer-readable medium comprising instructions that, when executed, cause the system to use one or more of the processes to process a query of the graph database by:
  obtaining, from the query, a compound representing a compound relationship specified by two or more edges in the set of edges, wherein
    the compound is structured as a tuple which comprises a compound type representing a data type of the compound, and a set of identity-giving nodes,
    each identity-giving node in the set of identity-giving node includes a predicate in the set of predicates and a corresponding node in the set of nodes, and
    the tuple does not include any edge in the two or more edges;
  using the compound type and the set of identity-giving nodes to search the tuple in the graph database;
  if the tuple is located in the graph database, using the tuple to generate a result of the query; and
  providing the result in a response to the query.

20. The system of claim 19, wherein the tuple further comprises:
  an indication of a non-assertion of the tuple;
  a length; and
  a cardinatity associated with a predicate in the set of identity-giving nodes.

* * * * *

UNITED STATES PATENT AND TRADEMARK OFFICE
CERTIFICATE OF CORRECTION

PATENT NO.         : 10,671,671 B2
APPLICATION NO.    : 15/618238
DATED              : June 2, 2020
INVENTOR(S)        : Scott M. Meyer et al.

Page 1 of 1

It is certified that error appears in the above-identified patent and that said Letters Patent is hereby corrected as shown below:

On the Title Page

(71) Applicant: Delete "LinkedIn Corporation, Sunnyvale, CA" and insert --Microsoft Technology Licensing, LLC, Redmond, WA--.

In the Claims

Column 19
Claim 20: Line 27: Delete "cardinatity" and insert --cardinality--.

Signed and Sealed this
Seventh Day of July, 2020

Andrei Iancu
*Director of the United States Patent and Trademark Office*